July 7, 1942.   D. L. CHANDLER ET AL   2,288,887
AUTOMOBILE WINDOW APPARATUS
Original Filed June 22, 1940   3 Sheets-Sheet 1
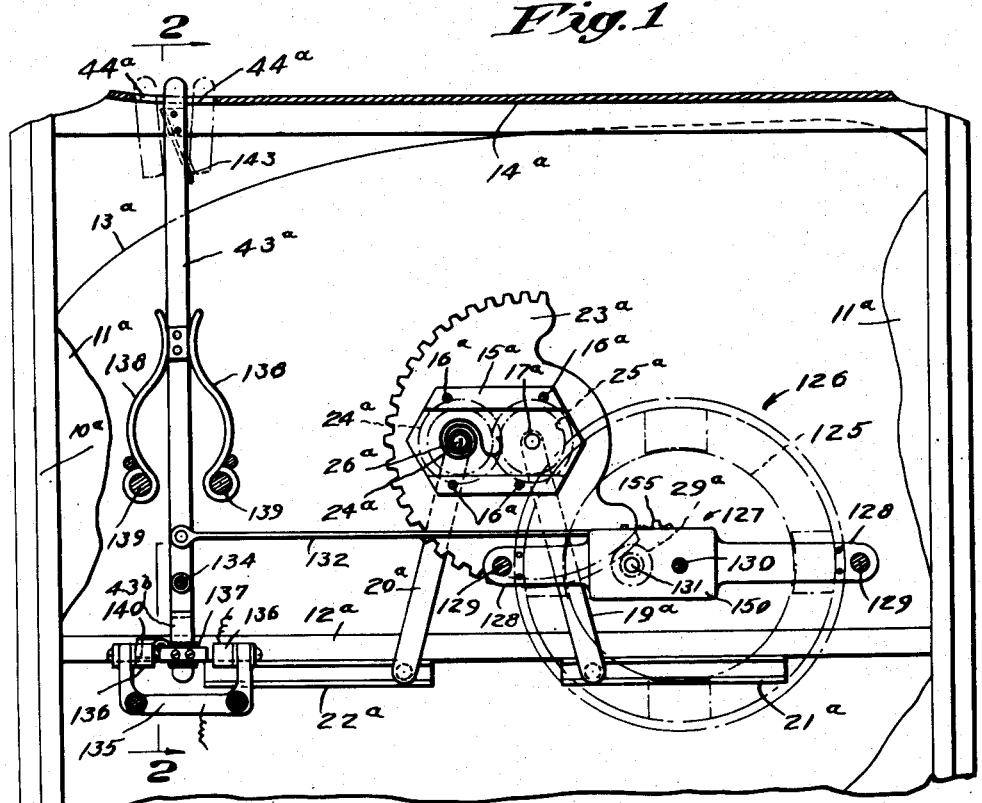
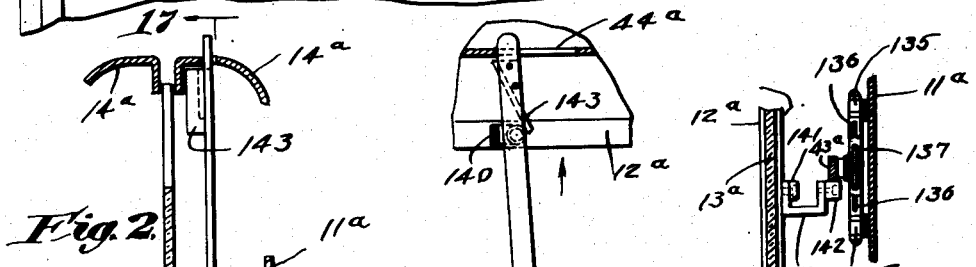
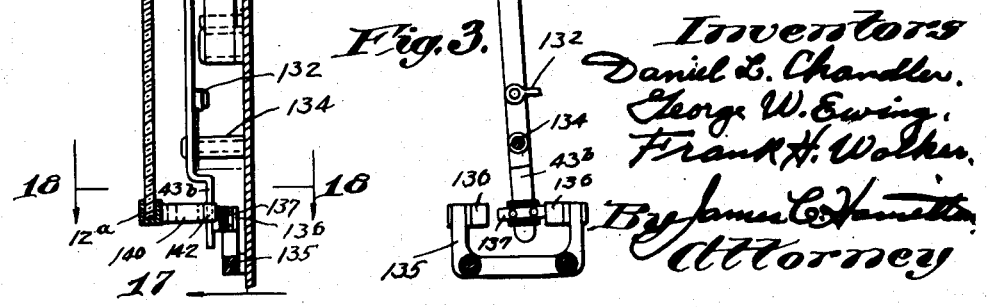

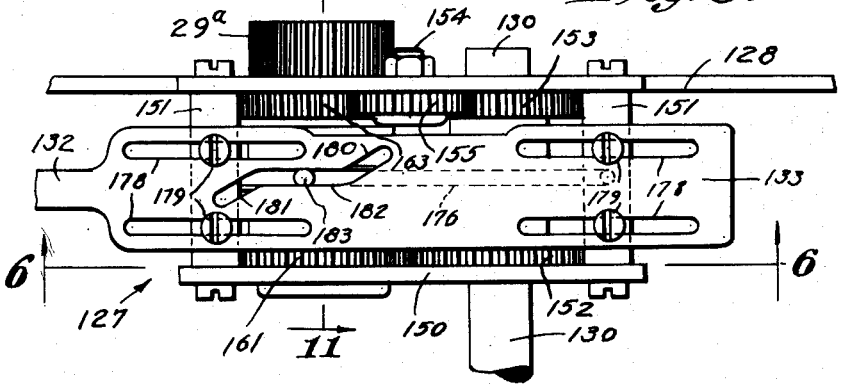
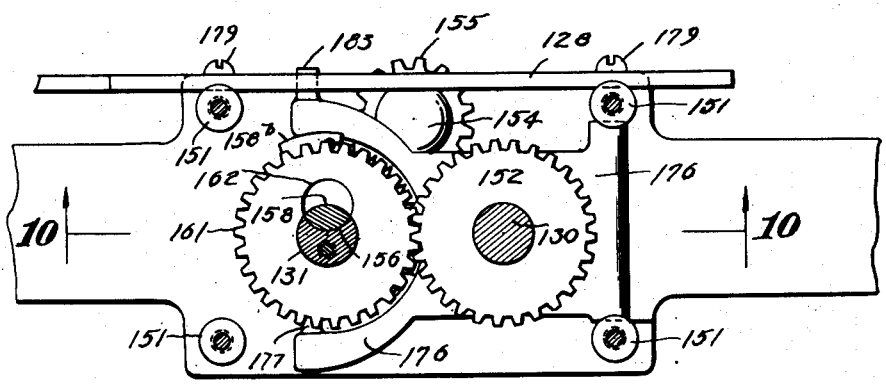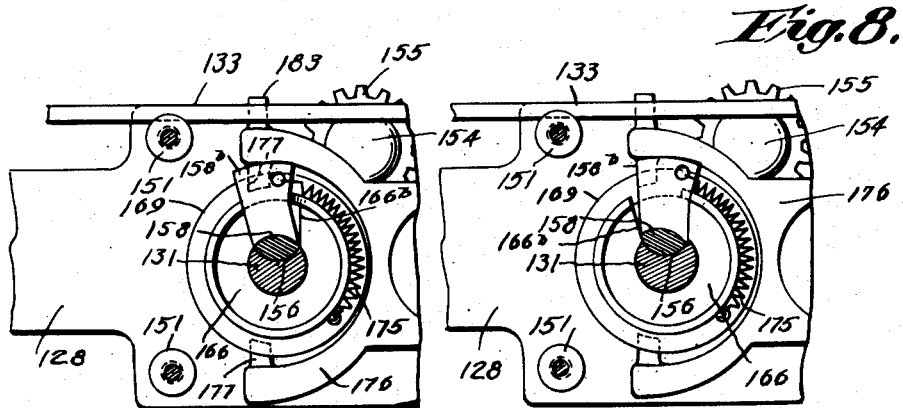

July 7, 1942.  D. L. CHANDLER ET AL  2,288,887
AUTOMOBILE WINDOW APPARATUS
Original Filed June 22, 1940   3 Sheets-Sheet 3

Inventors
Daniel L. Chandler.
George W. Ewing.
Frank H. Walker.
By James C. Hamilton
Attorney Patented July 7, 1942

UNITED STATES PATENT OFFICE 2,288,887

AUTOMOBILE WINDOW APPARATUS

Daniel L. Chandler, Salem, George W. Ewing, Peabody, and Frank H. Walker, Salem, Mass., assignors to Aresee Company Inc., Salem, Mass., a corporation of Massachusetts Original application June 22, 1940, Serial No. 341,838. Divided and this application January 2, 1941, Serial No. 372,934

3 Claims. (Cl. 268—124)

Our present invention relates to automobile window-sash raising and lowering mechanism being a division of application Ser. No. 341,838, filed June 22, 1940.

Heretofore, it has been the practice, in automobile door manufacture, to provide hand-operated mechanical means of a more-or-less automatic type in which the automobile window sash is raised and lowered by means of a crank, lever, or other hand motivated mechanisms. In all such devices, it is necessary for the operator of the window sash to perform a continuous sustained movement of the hand, arm, and body, in order to continue the movement of the window sash in either direction.

In the engineering field it is well known and recognized that more and more automobile control of the automatic type is fast superseding hand-operated mechanisms in which the operator's hand performs a continuous sustained movement during the operation of the various mechanisms.

In the present day manufacture of automobiles, this full-automatic development of controlling devices is making itself evident in many improvements which contribute to the ease and comfort of the operator.

Such automatic development not only contributes to the convenience of the operator but at the same time increases the safety factor in the operation of the vehicle by relieving the operator from many minor physical duties heretofore necessary and thereby giving him more time to direct his attentions to road hazards which require his full attention.

In our present invention, we have designed and developed a new automatic control mechanism for automobile window sash which is not only convenient to the operator of the vehicle but does not require any continuous sustained movement of his hand when it is desired to raise or drop the window-sash of the automobile.

Our present invention involving automatic control of the window-sash substitutes electricity for manual power in the sustained movement of the window-sash so that one initial movement of the operator's finger sets in motion the movement of the window sash, either up or down, and the release of pressure exerted by the operator, instantly stops the movement of the window-sash, in either direction. Furthermore, automatic mechanism is provided which makes it impossible for the operator to continue the direction of movement of the window-sash in either direction beyond a certain point thereby making it impossible for the operator to damage the apparatus, at the same time making it unnecessary for the operator to keep his eye on the movement of the window-sash when his attention may be needed other places. In other words, when the window-sash reaches its maximum top or bottom movement, as the case may be, the movement is automatically checked and the operator cannot continue such movement further even though his attention may be centered elsewhere. To reverse the movement of the window-sash, a reverse movement of the operator's hand is necessary. This is a very important feature in any automatic apparatus of this type because the operator cannot always be watching the window-sash in its movement while he is driving in traffic or at other times when his vision may have to be directed in front of him on the road, intersections, or oncoming vehicles, also it is important that such window movement ceases when the limit of travel is reached in order to prevent damage to the apparatus.

The principal object of our invention is an improved automobile window-sash operating mechanism;

Another object is an improved automatic window-sash operating mechanism automatically operated by means of electricity;

Still another object is an improved automobile window-sash operating mechanism which is automatically operated by means of reversably controlled electrically driven raising and lowering mechanism;

And still another object is an improved automobile window-sash operating mechanism which is automatically operated by means of reversably controlled and electrically driven raising and lowering mechanism having automatic stop devices adapted to limit the movement of the window-sash in either an up or down movement, and Other objects and novel features comprising the construction and operating of our improved device will be apparent as the description of the same progresses.

In the drawings illustrating our invention:

Fig. 1 is an assembled inside elevation of the window-sash mechanism as mounted on an automobile door, portions of the door having been broken and other parts removed to better show the arrangement of parts;

Fig. 2 is a cross-section, parts of which are broken away for the sake of convenience being taken on line 2—2 of Fig. 1;

Figure 9:
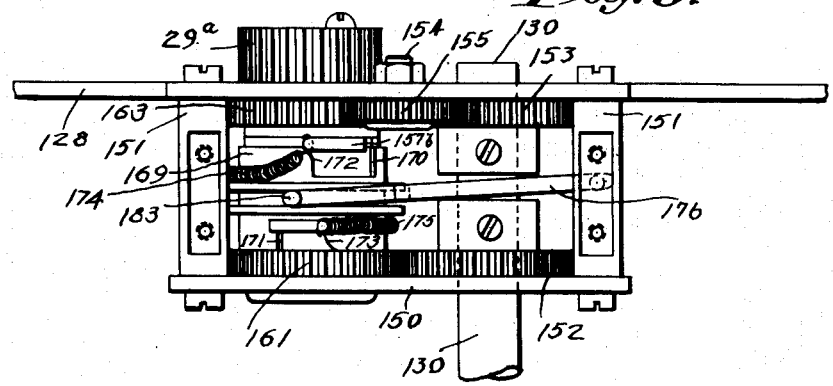
Figure 10:
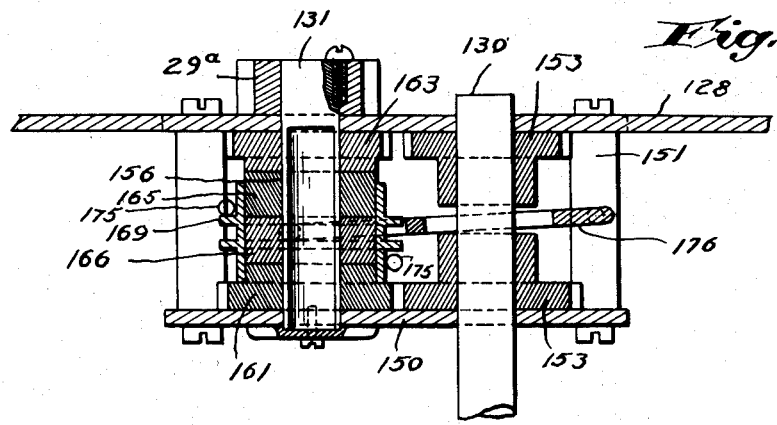
Figure 11:
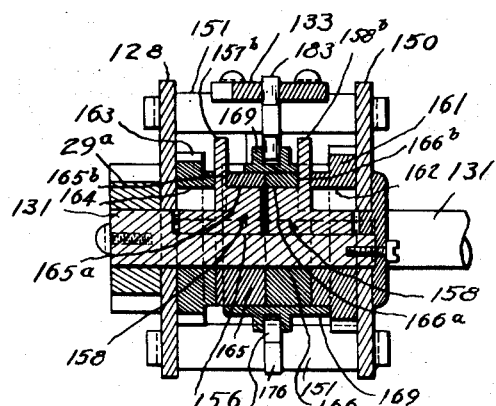

Fig. 3 is a cross-section taken on the line 3—3 of Fig. 2 particularly showing the operating lever thrown to the left-hand position shown in dot-and-dash lines in Fig. 1. The position shown in this figure illustrates the window sash moving upward and just prior to its topmost position preceding the movement of the operating lever to the right which will open the electrical switch contact on the lower end of the operating lever;

Fig. 4 is a fragmentary cross-section taken on the line 4—4 of 2;

Fig. 5 is a top plan view of the reversing mechanism indicated in Fig. 1, portions of which are broken off for convenience;

Fig. 6 is a cross-section taken on the line 6—6 of Fig. 5 showing a side elevation of the reversing mechanism with the near side plate removed;

Fig. 7 is a fragmentary side elevation of Fig. 6, the left-hand portion being cut off and the spur gear removed to better show one of the reversing members;

Fig. 8 is another side elevation similar to Fig. 7, but showing the reversing member in a different position;

Fig. 9 is another top plan view similar to Fig. 6, the reversing slide having been removed;

Fig. 10 is a cross-section taken on the line 10—10 of Fig. 6, the front plate shown in Fig. 5 being included;

Fig. 11 is a cross-section taken on the line 11—11 of Fig. 5, and

Figure 12:
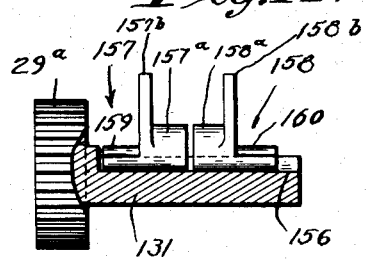

Fig. 12 is a partial elevation and cross-section of the reversable drive shaft showing the reversing members in place on the shaft portion, as removed from the rest of the apparatus.

Referring more in detail to the drawings illustrating our invention, 10a indicates the side frames of an automobile door. In conventional automobile door design the inside panel 11a is provided upon which the window-sash 12a elevating and lowering apparatus is mounted. The window-sash glass 13a is slidably mounted in the door frames 10a so that the glass 13a and the channel sash member 12a in which the glass is mounted can be moved up or down.

A split window sill 14a is provided between the slide frames 10a and so positioned that the glass 13a can be moved up and down between the sill members to any degree of height desired by the operator.

In Fig. 1 it will be noted that we have provided a frame member 15a having bolts 16a, the bolts being shown in cross-section and normally adapted to be fastened in the panel 11a which is cut away. Pivoted in the frame member 15a at 17a and 18a are lever arms 19a and 20a. The lower ends of the arms 19a and 20a are provided with rollers which engage in the channel members 21a and 22a which are fixed to the bottom face of the glass channel member 12a. On the far side of the frame member 15a and attached to the lever arm 19a is segmental gear member 23a. The lever arm 20a is engaged with the lever arm 19a through gears 24a and 25a. A counter balance spring 26a is fixed to the pivot 18a and anchored at 27a to any convenient portion of the frame 15a.

Assuming that the frame 15a is stationarily mounted to the door panel 11a and the gear segment 23a is rotated, it will be apparent that the arms 19a and 20a will swing in opposite directions about the pivots 17a and 18a and raise or lower the member 12a and attached glass 13a.

In conventional door design a shaft is journalled in the frame 15a and is further provided, on the far side, as viewed in Fig. 1 with a pinion which engages with the teeth in the segment gear 23a, so that the operator can operate the window control mechanism from the inside of the vehicle.

In our present invention we have eliminated certain parts above referred to, as follows:

At 125 we have indicated in dot-and-dash lines the rotor of a unidirectional motor which is generally indicated at 126. Attached to the motor frame is a reversing mechanism 127. The extension members 128 are provided with bolts 129 which are secured to the panel 11a. The rotor 125 of the motor 126 is directly connected to the shaft 130 which is reversably connected to a shaft 131 to which is solidly attached the pinion 29a which engages with the segment 23a. The reversing mechanism between the shaft 130 and the pinion 29a will be described in detail further along in the specification.

Connecting with the reversing mechanism 127 is an extension lever 132. The reversing end of the lever 132 is attached to a reversing slide 133, better shown in Fig. 5, the left end being pivoted to the operating lever 43a. The operating lever 43a is pivoted at 134 to the panel 11a in the same manner as the operating lever 43a shown in Fig. 3. Also attached to the panel 11a is a switch member 135 upon which are carried electrical switch contacts 136, the member 135 being connected to the contacts 136 and one side of the motor 126. On the lower end of the lever 43a and insulated therefrom is knife switch blade 137 which is electrically connected to said motor 126. The switch comprising the members 135, 136 and 137 is of the single pole double throw type. In Fig. 1 the operating lever 43a is shown in full lines in its neutral position, the dot-and-dash lines at the top indicates the position of the lever 43a when the window is in motion either up or down. When the lever 43a is pushed to the left-hand side the glass 13a rises and when pushed to the right-hand side the glass 13a moves downwardly. When the lever 43a is released from either the right-hand or the left-hand position the springs 138 which are anchored to the pins 139 in the panel 11a returns the lever 43a to its neutral position. It will be apparent that in either the right or left-hand position, the knife switch member 137 will be engaged with the electrical circuit from the switch member 135 but when in a neutral position the electrical circuit is open.

Attached to the glass channel member 12a is a bracket member 140. On the parallel portions of the bracket 140 are roller members 141 and 142. By an inspection of the lower end of the operating lever 43a, as shown in Fig. 2, it will be noted that the lever is offset, the near portion 43b engaging with the roll 142. At the upper portion of the operating lever 43a is a cam bracket 143.

Assuming that the lever 43a is pushed to the left-hand dot-and-dash position and held there by the operator, the glass channel member 12a will rise until the roll 141 contacts the cam member 143 at which point the lever 43a will be pushed back into neutral position and the electrical circuit opened. Assuming that the glass 13a is up and the lever is pushed to the right-hand dot-and-dash position and held there, then when the roll 142 reaches the offset portion 43b, the lever 43a will be returned to neutral position and again the electrical circuit will be opened. The glass 13a may be stopped at any point by simply releasing the lever 43a, the springs 138 returning the lever 43a to its neutral position.

The reversing of the segment 23a is entirely accomplished within the mechanism 127 without even waiting for the motor rotor 125 to actually stop. The operating lever 43a may be pushed from right to left or left to right instantly even though the motor 126 is running continuously, and also the window glass may be stopped instantly even though the motor 126 continues to operate because when the lever 43a is in neutral position the pinion 29a is de-energized and is free from driving connection with the shaft 130, as will be described further along in the description of the reversing mechanism 127.

The mechanism 127 is composed of two supporting side portions 128 and 150 being spaced apart by means of end posts or studs 151. The drive shaft 130 which is directly connected to the rotor 125 extends through both sides 128 and 150. On the inside faces of the sides 128 and 150, and set screwed to the drive shaft 130, are gears 152 and 153. Freely journalled on the shaft 154 on the side 128 is a reversing pinion gear 155.

Journalled in the sides 128 and 150 is the pinion shaft 131, the back end of which is fixed to the pinion gear 29a which is directly engaged with the gear teeth on the segment gear member 23a. At a point in the journal of the side frame 128, the shaft 131 is recessed, as shown in Figs. 6, 7, 8, 10 and 12, the recess being indicated at 156 and continuing all the way along the shaft to the front end. The recess 156 is curved on a radius equal to the radius of the shaft 131. Operating in the same recess 156 are key members 157 and 158. The central opposed ends 157a and 158a have diameters equal to the diameter of the shaft 131. The outer ends of the members 157 and 158 are cut down and curved having radial surfaces 159 and 160 corresponding to the radius of the shaft 131. In Figs. 7 and 8, we have removed the gear 161 which is normally engaged with the gear 152. It will be noted that the gear 161 is provided with an offset recess 162, shown in Fig. 6. When the end 160 of the key member 158 is in a neutral position, as shown in Fig. 6, the gear which is driven by the gear 152 is in an idling position and no movement of the shaft will take place as a result of the turning of gear 161, but when the key 158 is swung to the right, as shown in Fig. 8, the shaft 131 becomes locked with the gear 161 because the end 160 of the key member 158 has then been swung into the recess 162.

On the opposite end of the shaft 131 is another gear 163 which is also provided with a recess 164 similar to the recess 162 in the gear 161. In a similar manner, when the end of the key 157 is in a neutral position the gear 163 idles around the key end and does not drive the shaft 131. Separating the key members 157 and 158 are collars 165 and 166 both of which have recesses 166a and 165a both of which are identical with the recess 162 in gear 161. The round ends 157a and 158a are journalled in the respective recesses 165a and 166a of the collars 165 and 166 on their upper portions and in the shaft recess 156 on their lower portions. In the outer faces of the collars 165 and 166 are provided recesses 165b and 166b. The recesses are provided with radial side edges. On the upper portion of the key members 157 and 158 are provided levers 157b and 158b respectively which are located in the said recesses 165b and 166b. The slots 165b and 166b are wider than the lever members 157b and 158b so that the levers may be swung to the positions shown in Figs. 7 and 8.

Engaging over the outer peripheries of the collars 165 and 166 and the hub portions of the gears 161 and 163 is the reversing collar 169. This collar 169 can be slid endwise and is provided with recesses 170 and 171. The recesses at their innermost points are the same width as the levers 157b and 158b but adjacent their outer portion there are provided cam surfaces 172 and 173. By an inspection of Fig. 9, it will be noted that these cam recesses are reversed, the recess cam surface 172 being on the left-hand side and the recess cam surface 173 being on the right-hand side of the collar 169. A spring 174 is anchored to the left-hand side of the collar 169 and the lever 157b. Another spring 175 is anchored to the right-hand side of the collar 169 and the lever 158b. When the reversing collar is slid to the right, as viewed in Fig. 11, the lever, as shown in Fig. 8, is rotated to the position shown in Fig. 7, and the restricted portion of the collar recess 171 holds it in place thereby allowing the gear 161 to idle on the shaft 131. In this position, of the collar 169, the recess 170 has moved away from the lever 157b leaving it tipped to the left by means of the spring 174, as shown in Fig. 9. When the lever 157b is in the position shown in Fig. 9, the end 159 of the key 157 is turned in the shaft recess 156 up into the recessed portion 164 of the gear 163 thereby causing the gear 163 to engage the shaft 131. In a similar manner to that shown in Fig. 8, except that the position of the parts are reversed, as viewed from Fig. 8.

A yoke member 176 is pivoted in the studs 151 to the right of the mechanism 127, the yoke portion having pins 177 adapted to engage in the annular central groove in the reversing collar 169. On the top of the mechanism 127 and slidably engaged in the slots 178 are screws 179 screwed into the studs 151. The slide 133 is provided with a reversing slot having cam recesses 180 and 181 connected together by a neutral passage 182. A pin 183 attached to the yoke member 176 engages in this reversing slot.

On the far inner side adjacent the member 128 are the gears 153, 163 and 155. The gear 155 engages both the gears 153 and 163 and acts as a reversing gear between the gears 153 and 163. The gear 153 is fixed to the shaft 130 and moves in one direction only.

Assuming that the shaft 130 is moving in a clock-wise direction and the key member 157 is in the position indicated in Fig. 9. In such position the gear 163 is engaged with the shaft 131 and the gear 161 is idling, being in the position shown in Fig. 6 with respect to the key 158. The reversing slide 133 is back to the left with the yoke pin 183 located in the cam portion 181 of the reversing slot. Under such conditions, the pinion 29a also rotates to the right or in a clock-wise direction, similar to shaft 130.

Assuming that the slide 133 is slid all of the way to the left and the pin 183 is now in the cam portion 180 of the reversing slot. In such position, the key 158 is now engaged with the gear 161 and the gear 163 and reverse gear 155 are idling. In this position, the gear 152 drives the gear 161 and shaft 131 in a counter-clock-wise direction.

Assuming that the slide 133 is slid part-way back in either direction and the pin 183 is engaged in the neutral position 182 in the reversing slot of the slide. In such position both the levers 157b and 158b of the keys 157 and 158 respectively are entered in the restricted recesses 170 and 171 of the reversing collar 169 the result of which is that both ends 159 and 160 of keys 157 and 158 are in their neutral position, corresponding to Fig. 6 with respect to the shaft 131, therefore both gears 161 and 163 are idling and the shaft 131 does not turn even though the shaft 130 and gears 152 and 153 continue to rotate.

In operation, if it is desired to raise the glass 13a shown in Fig. 1, and assuming that the shaft 130 rotates in a clock-wise direction, the operating lever 43a is moved to the right. The slide 133 also moves to the right and the gear 163 engages with the drive shaft 130 thereby causing the segment gear 32a to rotate counter-clockwise. By releasing the operating lever 43a at any point during the travel of the glass 13a, the spring 138 immediately returns the lever to its neutral position opening the electrical circuit to the motor 126 thereby checking the glass movement. When the lever 43a is in a neutral position and the reversing slide 133 is also in a neutral position, and even though the motor 126 continues to rotate in momentum, the segment gear 32a stops at once. Should the operator wish to instantly raise the glass a small amount, a reversal of the lever starts the segment turning in a reverse direction although the motor rotor 125 is continuing to revolve.

As previously described, the lever 43a is returned to neutral position at either extreme movement of the glass 13a, and in so doing, the electrical circuit to the motor 126 is not only cut off but in addition thereto the reversing mechanism slot returns the yoke 176 freeing both gears 161 and 163 from the shaft 131 which carries the pinion 29a which engages the segment gear 23a.

Having thus described our invention what we claim as new is:

1. In an electrically operated window for automobile doors and the like having a geared raising and lowering mechanism connected to said window by means of levers geared together, one of said levers being fixed to a segmental gear member pivoted in said door and engaged with a pinion drive gear fixed to a shaft journalled in a reversing mechanism also mounted in said door, said shaft being provided with idling gears intermittently engaged with said pinion shaft by means of a sliding clutch which is operated by means of a sliding cam member engaged with said clutch, and an electrical motor and motor shaft journalled in said reversing mechanism, the said motor being of a unidirectional type the motor shaft connecting said idling gears on said pinion shaft by means of a gear train, in combination with an operating lever pivoted in said door, the upper end of said lever extending through the sill of said window for the purpose of providing a hand hold for operating said operating lever, an extension lever pivoted to said operating lever at a point above the pivot point of said operating lever in said door, the other end of said extension lever being attached to said sliding cam member, an electrical switch located in said door and electrically connected with said motor, a portion of said switch comprising the moving contact members attached to the lower end of said operating lever for the purpose of closing said switch when said operating lever is pivoted in either direction, neutralizing springs mounted in said door and engaging said operating lever on each side for the purpose of neutralizing the position of said operating lever when released by the hand of the operator thereby opening said switch and neutralizing the said clutch.

2. In an electrically operated window for automobile doors and the like having a geared raising and lowering mechanism connected to said window by means of levers geared together, one of said levers being fixed to a segmental gear member pivoted in said door and engaged with a drive gear fixed to a shaft journalled in a reversing mechanism also mounted in said door, said shaft being provided with idling gears intermittently engaged with said pinion shaft by means of a sliding clutch which is operated by means of a sliding cam member engaged with said clutch, and an electrical motor and motor shaft journalled in said reversing mechanism, the said motor being of a unidirectional type the motor shaft connecting said idling gears on said pinion shaft by means of a gear train, in combination with an operating lever pivoted in said door and having an extension portion extended through the sill of said window for the purpose of providing a handle for the operator, an extension lever pivoted to said operating lever and attached to said sliding cam member, an electrical switch attached to the lower end of said operating lever and said door, neutralizing springs mounted in said door and contacting said operating lever for the purpose of neutralizing the position of said operating lever when released by the operator's hand thereby opening said switch and moving said sliding cam member into a neutral position for the purpose of placing the said pinion gear shaft idling gears out of driving contact with said pinion shaft.

3. In a sliding window having an electrical operator comprising a geared segment attached to pivoted levers slidably connected to said window and a reversing geared mechanism driven by means of an electrical motor, the geared mechanism engaging the said geared segment having a drive shaft and reversing gears engageably located thereon and a clutch slidably movable on the major axis of said drive shaft for the purpose of engaging either of said reversing gears with said drive shaft and permitting said reversing gears to idle on said drive shaft when said clutch is in a neutral position, a sliding cam member controlling said clutch, gears connecting said motor with said reversing gears in combination with, a combination operating lever, the operating lever being provided with moving electrical switch members on one end engaging with permanent electrical switch members mounted in said door, the said permanent switch members being electrically connected with said motor, the said operating lever being pivoted in said door such that when the said lever is pivoted to one side or the other an electrical circuit is closed between the said moving switch member and the said permanent switch members switch and said motor, and when the said lever is in a neutral position the said switch is open, equalizing springs mounted in said door and contacting said lever for the purpose of neutralizing the position of said lever, an extension lever attached to said sliding cam member on said reversing mechanism and pivoted at one end to the said operating lever at a point above the pivot point of said operating lever in said door, the neutral position of said operating lever corresponding to the neutral position of said sliding clutch.

DANIEL L. CHANDLER.
GEORGE W. EWING.
FRANK H. WALKER.